Oct. 11, 1949.  O. J. POUPITCH  2,484,644
SELF-LOCKING AND SEALING SCREW
Filed April 13, 1945
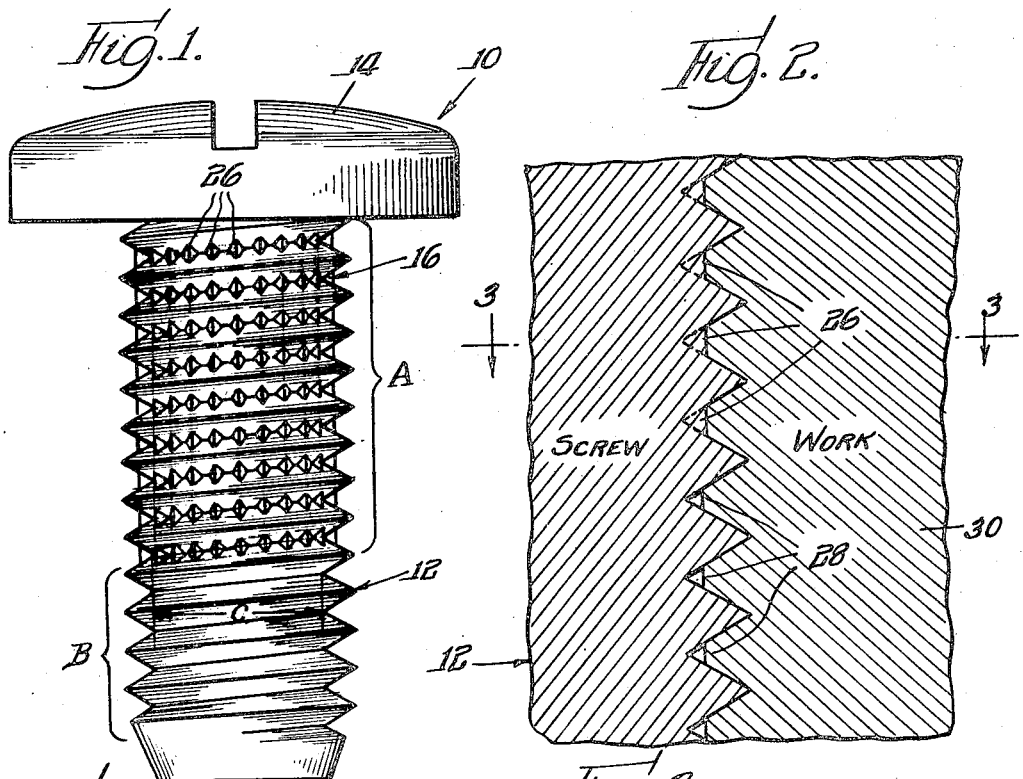
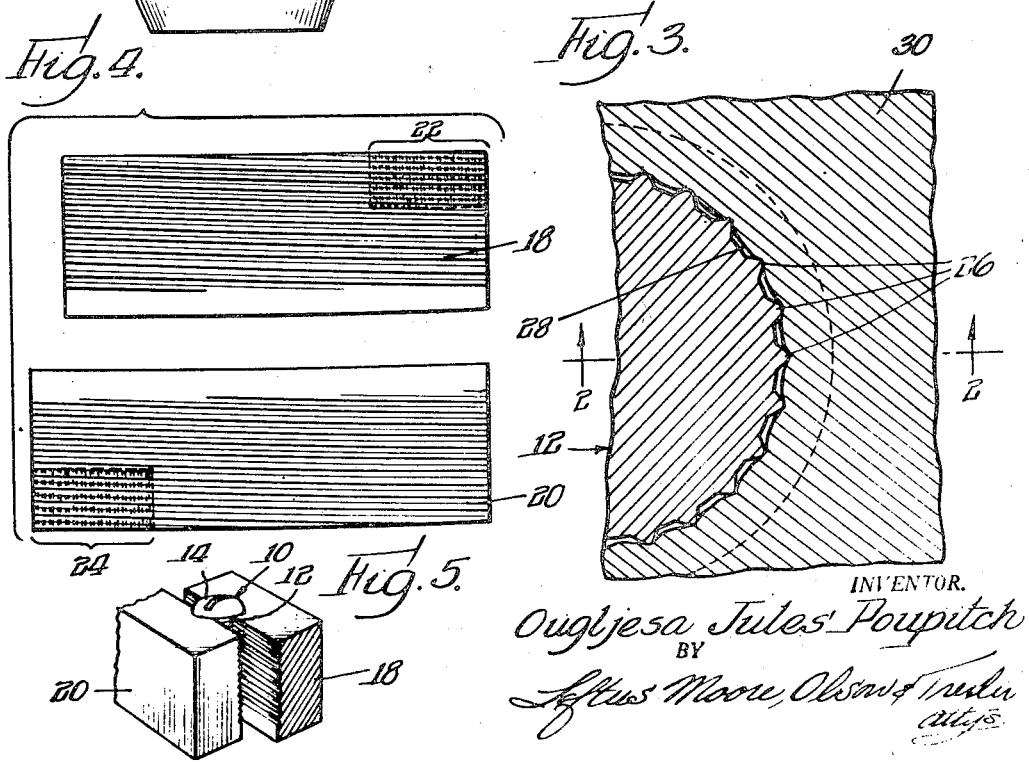
INVENTOR.
Ougljesa Jules Poupitch Patented Oct. 11, 1949

2,484,644

UNITED STATES PATENT OFFICE 2,484,644

SELF-LOCKING AND SEALING SCREW

Ougljesa Jules Poupitch, Chicago, Ill., assignor to Illinois Tool Works, Chicago, Ill., a corporation of Illinois Application April 13, 1945, Serial No. 588,089

3 Claims. (Cl. 85—1)

This invention relates generally to self-locking screws and more particularly to screws designed to lock within the threaded aperture of a work piece by impingement of the crown of the thread of the work piece.

It is an object of the present invention to provide a screw in which an enlarged root portion thereof is adapted to lockingly and sealingly impinge the crown of a complementary thread in a work piece.

In the manufacture of screws, particularly in instances where screws are manufactured by the thread rolling process, it is not uncommon for the finished screws to vary within certain tolerance limits as to outer and root diameters. In order for screws of the type referred to above to lockingly impinge the crown of a complementary thread in a work piece the root diameter of the screw must be slightly larger than the internal diameter of the threaded work aperture. If the root diameter of the locking portion of the screw is too large then impingement of the root surface with the crown of the thread of the work is so great that the screw can only be inserted by the application of excessive rotative force, and if the frictional engagement of the complementary threads is too great there exists the potential danger of screw breakage. If the root diameter of the locking portion of the screw is under sized the impingement of the root surface with the work thread may be insufficient to effect locking or sealing. It is therefore one of the important objects of the present invention to provide a self-locking and self-sealing screw of the type referred to above which may be used without the slightest possibility of either excessive or insufficient thread impingement. To this end the invention proposes the use of a novel root locking portion which is not only efficiently operative but which may be produced by practicing a simple and inexpensive rolling or extruding process.

It is a further object of the present invention to provide a root locking screw as referred to above which is so designed as to enable locking impingement of the crown of a complementary thread in a work aperture along circumferentially spaced areas rather than along a continuous helical portion of the thread.

It is still a further object to provide a screw having the locking characteristics just mentioned which may be inserted within a thread work aperture with minimum effort and at the same time insure effective locking and perfect sealing.

The foregoing and other objects and advantages will be more apparent from the following detailed description when considered in connection with the accompanying drawing wherein:

Fig. 1 is a side elevational view of the screw constructed in accordance with the teachings of the present invention;

Fig. 2 is an enlarged fragmentary sectional view taken longitudinally of the screw substantially along the line 2—2 of Fig. 3;

Fig. 3 is a horizontal sectional view of the screw and associated work piece taken substantially along the line 3—3 of Fig. 2;

Fig. 4 is an elevational view of die members which may be employed to extrude the threads and locking protuberances along the root of the thread; and Fig. 5 is a fragmentary perspective view disclosing the position occupied by the dies of Fig. 4 during the thread rolling operation.

Referring now to the drawing wherein like numerals have been employed to designate similar parts throughout the various views it will be seen that one embodiment of the present invention comprises a screw designated generally by the numeral 10. This screw has a threaded shank portion 12 and a suitable head 14 formed integral therewith. For purposes of illustrating one practical embodiment of the invention the screw shank 12 is provided with a machine screw thread of conventional form. The axial pitch of the screw thread is uniform throughout the length of the screw shank and the outer diameter is also uniform and conforms with established machine screw standards.

The portion of the screw shank included within the bracket A (Fig. 1) will hereinafter be referred to as the locking portion or section of the screw and the portion designated by the bracket B will be referred to as the entering section of the screw. While in the disclosed embodiment the entering section B of the screw has a thread of uniform outside and inside diameters, it will be apparent that in instances where desired the entering extremity of the portion B may be equipped with thread convolutions which diminish in height toward the extremity to facilitate initial insertion of the screw in a threaded work aperture. In other words, the entering portion of the screw may vary in certain respects conforming with standard machine screw design.

The normal root diameter of the screw is indicated by the letter C. It will be noted that the root of the entering screw section B is of conventional V-shaped cross section whereas the root portion 16 of the locking section A does not conform with machine screw standards. This results from the fact that when the screw is rolled between the complementary thread rolling dies 18—20 of Fig. 4 portions 22—24 of these dies cause section A of the screw blank to be formed with thread convolutions having a maximum root diameter larger than the normal root diameter C. In fact the sections 22—24 of the dies form counterparts of a series of peripheral root protuberances 26 which extend radially beyond the area defined by the root diameter C.

It will be apparent from the foregoing description that these protuberances 26 will impinge or press against the crown of complementary convolutions 28 in a threaded aperture of a work piece 30, Figs. 2 and 3. The thread convolutions of normal configuration in the entering section B facilitate the initial insertion of the screw within the threaded work aperture, and continued rotation of the screw causes the protuberances 26 to be moved into engagement or impingement with the crown of the complementary thread convolutions of the work. When the head 14 of the screw is finally tightened against the work surface, the entire helical area defined by the enlarged root portion of the screw section A will serve to not only lock the screw in place but will also provide an effective seal to prevent leakage of liquids such as oil axially of the screw body. Obviously the extent to which the root of the screw lockingly engages the crown of the thread in the work will depend upon the degree of surface impingement between the protuberances 26 and the work thread.

By having the root of the locking section of the screw formed with a series of protuberances rather than a continuous helical surface area for engaging the work thread, the ease with which the screw may be turned in the work is materially facilitated. That is, by distributing thread impingement over a helical series of surface areas of limited size, resistance to rotation of the screw is minimized without sacrificing locking and sealing effectiveness. These protuberances exert a cam-like action against the crown of the work thread at circumferentially spaced intervals, each protuberance providing an effective fluid seal and resistance to unintentioned retrograde rotation of the screw. By circumferentially distributing thread engagement over the aforesaid limited areas the root diameter of the locking section taken across the crests of the protuberances may be substantially greater than the corresponding root diameter in screws equipped with a locking section having a smooth uniform root surface.

As previously pointed out, screw sizes vary within certain permissible tolerances. These variations result from corresponding variations in thread rolling dies, etc. Therefore, in order that a root locking section of the type described herein function efficiently for a given size of screw, such a locking section must be designed to accommodate variations in screw sizes within established tolerance limits. The use of a plurality of circumferentially spaced root areas of limited size to engage the crown of the work thread answers this purpose. It is also a well known fact that threaded work apertures vary within certain tolerance limits.

The crown of a thread in a tapped hole ordinarily presents a flat-like unfinished surface as distinguished from a sharp finished V cross-section. This is due to the fact that the tapped thread is usually not greater than 75% of the full depth of the thread. Hence the crown of the thread is truncated. When an ordinary machine screw is inserted within such a tapped hole a helical space is presented between the unfinished or truncated crown of the work thread and the root portion of the screw thread as indicated in Fig. 2. Therefore an ordinary screw cannot be used without some auxiliary sealing device such as a sealing washer beneath the head, if it is necessary to prevent leakage of fluid through the threaded opening. The present invention contemplates traversing the above mentioned helical space positioned externally of the crown of the work thread by the spaced protuberances in the locking section of the screw. Not only does the impingement of the crest of the protuberances with the crown of the work thread provide effective locking and sealing, but also the space between the protuberances provides an area into which metal of the work may flow or expand as the protuberances are tightened against the crown of the work thread. Each protuberance presents a root surface area of restricted circumferential extent adapted to press against and thereby tend to flatten the complementary crown portion of the thread in a workpiece.

The present invention makes possible the provision of a locking screw which may be inserted with ease and at the same time insure an effective lock and seal. Obviously the locking area may be located along any portion of the screw and may extend over any desired helical length of screw thread depending upon its intended application. The form and spacing of the protuberances may also be designed to accommodate conditions incident to its use.

While certain specific structural features have been disclosed herein it should be understood that modifications and changes may be made without departing from the spirit and scope of the appended claims.

The invention is hereby claimed as follows:

1. For application to a work aperture having normal uninterrupted thread convolutions therein, a self-locking and sealing screw including a shank having a threaded locking section and a threaded leading section at the entering end thereof, at least a portion of said leading section having a thread convolution of normal root and crest diameter substantially complementary to the thread convolutions in the work aperture and the thread convolutions on said locking section being of normal crest diameter substantially complementary to the thread convolutions in the work aperture, and a plurality of circumferentially spaced integral protuberances interconnecting adjacent surfaces of the thread convolutions of the locking section and of limited size to permit the locking section to be threaded into the work aperture but extending radially beyond the root diameter of said normal thread convolution of the leading section sufficiently to lockingly impinge the crown portions of complementary thread convolutions of the work aperture whereby to prevent helical leakage in the vicinity of the root of the screw threads.

2. A self-locking and sealing screw according to claim 1, wherein the advancing sides of the protuberances present surfaces rising from the normal root diameter to the crests of the protuberances.

3. A self-locking and sealing screw according to claim 1, wherein the circumferentially spaced integral protuberances extend over more than one complete thread convolution of the screw.

OUGLJESA JULES POUPITCH.

REFERENCES CITED

The following references are of record in the file of this patent:

UNITED STATES PATENTS

| Number | Name | Date |
|---|---|---|
| 1,227,310 | Quick | May 22, 1917 |
| 1,914,696 | Le Fever | June 20, 1933 |
| 2,301,181 | Ilsemann | Nov. 10, 1942 |

FOREIGN PATENTS

| Number | Country | Date |
|---|---|---|
| 555,123 | Great Britain | Aug. 5, 1923 |